UNITED STATES PATENT OFFICE 2,214,152

OIL COMPOSITION

Benjamin Garrison Wilkes, Pittsburgh, Pa., assignor to Carbide and Carbon Chemicals Corporation, a corporation of New York No Drawing. Application February 18, 1938,
Serial No. 191,205

12 Claims. (Cl. 252—50)

This invention is concerned with compositions containing hydrocarbon oils, or other oleaginous materials, which are compatible with or which can be dissolved, dispersed or emulsified readily with water.

Because of the almost complete and universal lack of miscibility of oils and oleaginous substances with water, it is common to employ such expedients as mutual solvents (or solutes), emulsifying agents and extreme agitation in order to produce compositions in which water and oils are to be used in admixture. Many of the previously proposed agents for effecting physical combinations of oils and oleaginous materials with water are more or less disadvantageous in that they must be used in large proportion, do not function rapidly to cause dispersion, or require violent agitation, and most known agents are totally lacking in effectiveness in the presence of acids.

This invention has for its principal object the provision of oil and oleaginous compositions which largely overcome many such disadvantages as those mentioned above, and which can be made readily to dissolve or disperse in water with a minimum of agitation to form mixtures which will not easily separate into immiscible phases, and which are stable even in the presence of acid. Another object is to provide improved surface active agents capable of causing the dispersion, emulsification or solution of oils and water, and a simple and effective process for carrying this out.

The stated objects may be achieved and the novel compositions in which oils and the like are rendered compatible with water may be produced by employing surface active agents composed essentially of glyoxalidines and certain of their derivatives. Relatively small amounts of these substances are capable of promoting stable emulsions of oil in water, and they are effective in many industrial uses where emulsions, or so-called soluble oils, are required. Glyoxalidines may be regarded as dehydration products of certain amides, and they may be obtained by reacting polyamines and the higher carboxylic acids under certain conditions. The formation of these glyoxalidine compounds, while forming no part of the present invention, is indicated by the following scheme:

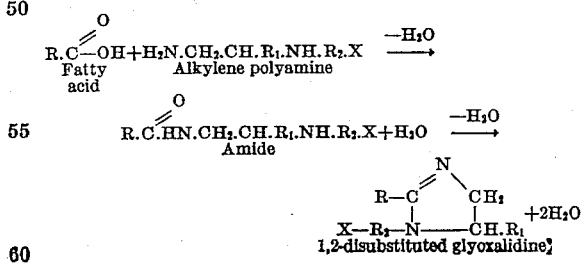

wherein R represents an alkyl or alkenyl group containing from 10 to 20 carbon atoms (the residue of a higher fatty acid); $R_1$ represents hydrogen or a lower alkyl group; $R_2$ represents an alkylene group or a lower alkyl substituted alkylene group; and X represents a hydroxyl group, an amino group or an amino-alkylene substituted imino group.

It is possible, and in some cases desirable, to form salts or soaps of these substituted glyoxalidines by reaction of acids, or the like, with the free amino or hydroxyl groups which they possess. In this case (assuming X to be an amino group), compounds of the general formula

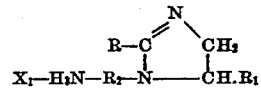

may be obtained, in which $X_1$ is an acid residue. Other forms of combination of acids with basic nitrogen atoms in the compounds may also occur.

The water-soluble (or dispersible) oil compositions or the emulsions or dispersions of the oil and water can be obtained by incorporating a small amount of one or more of the glyoxalidines or their derivatives in the oil or in a mixture of the oil and water. Specific procedures and compositions illustrating the invention are shown in the following examples.

Example I

A 5% by weight solution of 1-aminoethyl-2-heptadecenyl glyoxalidine in a mineral oil having a Saybolt Universal viscosity between 100 and 150 at 100° F. was prepared and diluted with water until the oil composition amounted to 1% of the total mixture. Slight agitation of this mixture produced a stable emulsion which did not separate even in the presence of salts or acids, even in concentrations as great as 5% hydrochloric acid. Lower concentrations of the glyoxalidine in the mineral oil produced practically identical results and gave excellent emulsions until its concentration in the oil was reduced to below 0.5% by weight.

This glyoxalidine was made by mixing one gram mole (282 grams) of oleic acid with two gram moles (206 grams) of diethylene triamine, and heating the mixture for a period of about 16 hours under a distilling column. Water was continuously removed until a temperature of about 245° C. was reached. The quantity of water thus removed amounted to about 1.7 moles. Unreacted diethylene triamine was distilled from the reaction mixture under vacuum, and the residue then was purified by distillation at an absolute pressure of 1 mm. of mercury, at which point it boiled within a temperature range of 225° to 250° C. About 220 grams of the 1-aminoethyl-2-heptadecenyl glyoxalidine was obtained as a pale yellow liquid. The product also may be designated, by reference to the reactants used in its preparation, as oleyl diethylene triamine.

*Example II*

Stable emulsions of mineral oil and water were made by mixing, with gentle agitation, water and the oil in which was dissolved a quantity of 1-(aminoethyl ethylimino)-2-heptadecenyl glyoxalidine equal to about 1% of its weight. In these compositions, the mineral oil used was a fraction having a viscosity of about 154 Saybolt Universal at 100° F. The emulsions produced were capable of dilution with water to almost any extent, and they were characterized by excellent stability over long periods of time.

This glyoxalidine was prepared by reacting 1 gram mole of oleic acid with three gram moles (438 grams) of triethylene tetramine in a vessel equipped with a distilling column. The mixture was heated for a period of about six hours, and water was continuously removed until a temperature of about 300° C. was reached. Approximately 1.9 moles of water were thus removed. The reaction mixture was then distilled under vacuum to remove excess triethylene tetramine. The product, which has been tentatively identified as 1-(aminoethyl ethylimino)-2-heptadecenyl glyoxalidine, or oleyl triethylene tetramine, was a gold-brown, moderately viscous, almost odorless liquid which was completely soluble in 5% hydrochloric acid.

*Example III*

A series of compositions were prepared by mixing a glyoxalidine obtained from the reaction of lauric acid and diethylene triamine with mineral oil having a viscosity of 154 Saybolt Universal at 100° F. The proportions of ingredients in these compositions is shown in the following table:

|  | Weight, percent | | | | | | | |
| --- | --- | --- | --- | --- | --- | --- | --- | --- |
|  | 1 | 2 | 3 | 4 | 5 | 6 | 7 | 8 |
| Hydrocarbon oil | 99.0 | 98.0 | 96.0 | 95.0 | 94.0 | 93.0 | 91.5 | 90.0 |
| 1-aminoethyl-2-undecyl glyoxalidine | 1.0 | 2.0 | 4.0 | 5.0 | 6.0 | 7.0 | 8.5 | 10.0 |

The oil and glyoxalidine were completely miscible in each of the compositions prepared. Portions of each of these compositions were then stirred into water in amounts to produce dispersions containing 5% by weight of the oil compositions. These compositions dispersed readily, and in those dispersions containing more than 3% of the glyoxalidine no great differences existed in the degree of dispersion, stability of the emulsions, or their viscosities. The first two compositions (that is, those containing less than 3% of the glyoxalidine) possessed less stability. Other mineral oils of 60, 68, 75, 78 and 100 Saybolt Universal viscosities were used in preparing virtually identical dispersions. The compositions of these types are especially useful as agricultural sprays where the ability to form dispersions of variable stability is important, since sprays of only temporary dispersions are frequently desired to permit the oily matter to be released after spraying. Also, toxic ingredients may be added to these compositions without affecting the stability of the emulsion whether the added substances be neutral, acid or alkaline in character.

Mineral oil compositions containing small amounts of the glyoxalidines or their derivatives are exceptionally well suited for use in the textile industry as fiber or yarn lubricants. Textile lubricants must be removed from the yarn or fibers at some stage in their treatment, and this is usually accomplished by "scouring" or washing the material in a water bath containing a mild soap or other detergent which will not injure the fibers. Because mineral oils alone are not removed with sufficient completeness in the usual scouring operation, it is usual to employ vegetable or animal oils as textile lubricants despite the disadvantageous tendencies of these oils to become rancid or to develop color and otherwise to deteriorate on ageing of the textile material bearing them. By this invention, mineral oils used as textile lubricants are rendered almost completely removable by the ordinary scouring bath, and the value of such mineral oil textile lubricants will be readily apparent. As an illustration of this feature of the invention, a series of tests were conducted as described below.

*Example IV*

Compositions formed of small amounts of various glyoxalidines and a mineral oil of 154 Saybolt Universal viscosity at 100° F. were applied to weighed skeins of worsted yarn, the quantity of lubricant applied in each instance being equal to 5% of the weight of the wool. The skeins were subsequently subjected to scouring in a bath containing 0.5% of olive oil soap and 0.2% of hydrated sodium carbonate. Uniform agitation in the scouring bath was maintained in each case for a period of 15 minutes, with a bath temperature of 120° F. and a bath-to-yarn weight ratio of 50. The scoured skeins, after being rinsed, were dried and thereafter subjected to extraction with ethylene dichloride to determine the residual oil or grease content of the wool. For comparison, skeins lubricated with mineral oil alone and with olive oil also were tested. The results of these tests are tabulated below:

| Scouring aid added to mineral oil lubricant | Amount of scouring aid (percent by weight) | Residual oil (percent by weight) |
| --- | --- | --- |
| 3.0 percent olive oil alone | None | 0.34 |
| 5.0 percent mineral oil alone | None | 4.30 |
| 1-aminoethyl,2-heptadecenyl glyoxalidine (oleyl diethylene triamine) | 1.50 | 1.16 |
| 1-aminoethyl,2-heptadecenyl glyoxalidine | 2.50 | 0.92 |
| Do | 4.00 | 0.70 |
| Do | 5.00 | 0.67 |
| Do | 7.50 | 0.66 |
| Do | 10.00 | 0.54 |
| 1-aminoethyl,2-heptadecyl glyoxalidine (stearyl diethylene triamine) | 4.00 | 1.17 |
| 1-hydroxyethyl,2-heptadecenyl glyoxalidine (oleyl hydroxyethyl ethylene diamine) | 4.00 | 0.68 |
| 1-aminoethyl,2-undecyl glyoxalidine (lauryl diethylene triamine) | 4.00 | 1.28 |
| 1-(aminoethyl ethylimino)-2-heptadecenyl glyoxalidine (oleyl triethylene tetramine) | 4.00 | 0.83 |
| 1-aminoisopropyl-2-heptadecenyl-5-methyl glyoxalidine (oleyl dipropylene triamine) | 4.00 | 0.88 |

Prolonged storage periods of wool lubricated with a glyoxalidine and mineral oil composition do not affect the completeness of oil removal by scouring in ordinary alkaline soap bath. Wool skeins lubricated with 5% by weight of a composition containing mineral oil and about 4% of 1-aminoethyl-2-heptadecenyl glyoxalidine (based on the weight of oil) were stored with free access to air for five weeks. When these skeins were subsequently subjected to scouring, the scoured yarn was found to contain only 0.65% of residual oil as determined by extraction with ethylene dichloride.

Substantially neutral mineral oil textile lubricants which can be practically completely removed by scouring may be made by incorporating in the oil up to about 8% by weight of a glyoxalidine fatty acid salt or soap. For example, oleyl diethylene triamine oleate (obtainable by reacting 7 parts by weight of 1-aminoethyl-2-heptadecenyl glyoxalidine with 6 parts by weight of oleic acid) may be added to a mineral oil lubricant. Worsted yarn containing 5% of this lubricating composition, after scouring as previously described, resulted in yarn having only 0.54% of residual oil.

Various alkylene polyamines may serve as starting materials in the preparation of the glyoxalidines for use in this invention. These include diethylene triamine, triethylene tetramine, hydroxyethyl ethylene diamine, dipropylene triamine, and tripropylene tetramine. The acids used in the preparation of the glyoxalidines may include generally the saturated or unsaturated fatty acids having 12 or more carbon atoms, and these include lauric, palmitic, oleic, linoleic, ricinoleic, and stearic acids. The glyoxalidines having one free amino group as described above may be reacted with various acids to form salts or soaps which are neutral in character. If the amino group is combined with a higher fatty acid, the salt or soap resulting is soluble in hydrocarbons, and may, in general, be substituted for the glyoxalidines themselves in the compositions of this invention.

In addition to the above suggested uses for the emulsions or soluble oil compositions of this invention, they may be used for many other purposes where oil compositions compatible with water are required, such, for example, as in polishes, cleansing compositions, cutting oils, deodorants, machine lubricants, sizing preparations and the like. Many modifications of the compositions described are possible without departing from the essential features of this invention, and such modifications are included within the invention as defined by the appended claims.

I claim:

1. A water-dispersible composition comprising a major proportion of oil together with a lesser quantity of a compound of the group consisting of substances of the formula

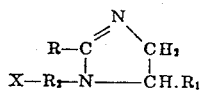

(in which R is an alkyl or alkenyl group containing from 10 to 20 carbon atoms; $R_1$ is hydrogen or a lower alkyl group; $R_2$ is an alkylene group or a lower alkyl substituted alkylene group; and X is a hydroxyl group, an amino group or an amino-alkylene imino group) and carboxylic acid addition products of these substances.

2. A composition comprising water and an oil dispersed therein or emulsified therewith by the aid of a surface active agent essentially composed of a compound of the group consisting of substances of the formula

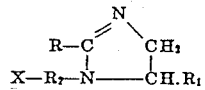

(in which R is an alkyl or alkenyl group containing from 10 to 20 carbon atoms; $R_1$ is hydrogen or a lower alkyl group; $R_2$ is an alkylene group or a lower alkyl substituted alkylene group; and X is a hydroxyl group, an amino group or an amino-alkylene imino group) and carboxylic acid addition products of these substances.

3. A water-dispersible composition comprising a major proportion of mineral oil together with a lesser quantity of a compound of the group consisting of substances of the formula

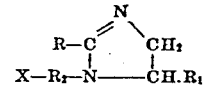

(in which R is an alkyl or alkenyl group containing from 10 to 20 carbon atoms; $R_1$ is hydrogen or a lower alkyl group; $R_2$ is an alkylene group or a lower alkyl substituted alkylene group; and X is a hydroxyl group, an amino group or an amino-alkylene imino group) and acid addition products of these substances.

4. A textile lubricant comprising a major proportion of mineral oil together with a lesser quantity of a compound of the group consisting of substances of the formula

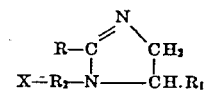

(in which R is an alkyl or alkenyl group containing from 10 to 20 carbon atoms; $R_1$ is hydrogen or a lower alkyl group; $R_2$ is an alkylene group or a lower alkyl substituted alkylene group; and X is a hydroxyl group, an amino group or an amino-alkylene imino group) and acid addition products of these substances.

5. A textile lubricant essentially composed of a mineral oil containing from about 1% to about 10% by weight of a compound of the group consisting of substances of the formula

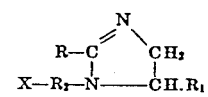

(in which R is an alkyl or alkenyl group containing from 10 to 20 carbon atoms; $R_1$ is hydrogen or a lower alkyl group; $R_2$ is an alkylene group or a lower alkyl substituted alkylene group; and X is a hydroxyl group, an amino group or an amino-alkylene imino group) and acid addition products of these substances.

6. A composition comprising water and at least about 1% of an oil dispersed therein or emulsified therewith by the aid of from about 1% to about 10% of the weight of said oil of a surface active agent essentially composed of a compound of the group consisting of substances of the formula

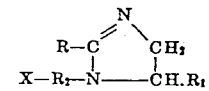

(in which R is an alkyl or alkenyl group containing from 10 to 20 carbon atoms; $R_1$ is hydrogen or a lower alkyl group; $R_2$ is an alkylene group or a lower alkyl substituted alkylene group; and X is a hydroxyl group, an amino group or an amino-alkylene imino group) and carboxylic acid addition products of these substances.

7. A water-dispersible composition comprising a major proportion of oil together with a lesser quantity of a compound of the group consisting of 1-aminoethyl-2-heptadecenyl glyoxalidine, 1-aminoethyl-2-heptadecyl glyoxalidine, 1-hydroxyethyl-2-heptadecenyl glyoxalidine, 1-aminoethyl-2-undecyl glyoxalidine, 1-(aminoethyl ethylimino)-2-heptadecenyl glyoxalidine, 1-aminoisopropyl-2-heptadecenyl-5-methyl glyoxalidine, and acid addition products of said compounds.

8. A composition comprising water and an oil dispersed therein or emulsified therewith by the aid of an agent essentially composed of a compound of the group consisting of 1-aminoethyl-2-heptadecenyl glyoxalidine, 1-aminoethyl-2-heptadecyl glyoxalidine, 1-hydroxyethyl-2-heptadecenyl glyoxalidine, 1-aminoethyl-2-undecyl glyoxalidine, 1-(aminoethyl ethylimino)-2-heptadecenyl glyoxalidine, 1-aminoisopropyl-2-heptadecenyl-5-methyl glyoxalidine, and acid addition products of said compounds.

9. A textile lubricant comprising a major proportion of mineral oil together with a lesser quantity of a compound of the group consisting of 1-aminoethyl-2-heptadecenyl glyoxalidine, 1-aminoethyl-2-heptadecyl glyoxalidine, 1-hydroxyethyl-2-heptadecenyl glyoxalidine, 1-aminoethyl-2-undecyl glyoxalidine, 1-(aminoethyl ethylimino)-2-heptadecenyl glyoxalidine, 1-aminoisopropyl-2-heptadecenyl-5-methyl glyoxalidine, and acid addition products of said compounds.

10. Process of treating textile fibers which comprises applying to the fibers a mineral oil textile lubricant in which is incorporated a small amount of a surface active agent essentially composed of a compound of the group consisting of substances of the formula

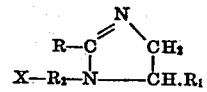

(in which R is an alkyl or alkenyl group containing from 10 to 20 carbon atoms; $R_1$ is hydrogen or a lower alkyl group; $R_2$ is an alkylene group or a lower alkyl substituted alkylene group; and X is a hydroxyl group, an amino group or an amino-alkylene imino group) and carboxylic acid addition products of these substances, and thereafter removing by scouring said lubricant from the textile fibers, said agent being adapted to assist the removal of said lubricant by scouring.

11. Process of treating textile fibers which comprises applying to the fibers a mineral oil textile lubricant in which is incorporated from about 1% to about 10% by weight of the oil of a surface active agent essentially composed of a compound of the group consisting of substances of the formula

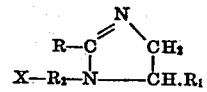

(in which R is an alkyl or alkenyl group containing from 10 to 20 carbon atoms; $R_1$ is hydrogen or a lower alkyl group; $R_2$ is an alkylene group or a lower alkyl substituted alkylene group; and X is a hydroxyl group, an amino group or an amino-alkylene imino group) and acid addition products of these substances, and thereafter removing by scouring said lubricant from the textile fibers, said agent being adapted to assist the removal of said lubricant by scouring.

12. Process of treating textile fibers which comprises applying to the fibers a mineral oil textile lubricant in which is incorporated from about 1% to about 10% by weight of the oil of an agent essentially composed of a compound of the group consisting of 1-aminoethyl-2-heptadecenyl glyoxalidine, 1-aminoethyl-2-heptadecyl glyoxalidine, 1-hydroxyethyl-2-heptadecenyl glyoxalidine, 1-aminoethyl-2-undecyl glyoxalidine, 1-(aminoethyl ethylimino)-2-heptadecenyl glyoxalidine, 1-aminoisopropyl-2-heptadecenyl-5-methyl glyoxalidine, and acid addition products of said compounds, and thereafter removing by scouring said lubricant from the textile fibers, said agent being adapted to assist the removal of said lubricant by scouring.

BENJAMIN GARRISON WILKES.

CERTIFICATE OF CORRECTION.

Patent No. 2,214,152. September 10, 1940.

BENJAMIN GARRISON WILKES.

It is hereby certified that error appears in the printed specification of the above numbered patent requiring correction as follows: Page 3, second column, line 4, claim 2, strike out the word "carboxylic" and insert the same before "acid" in line 20, claim 3; and that the said Letters Patent should be read with this correction therein that the same may conform to the record of the case in the Patent Office.

Signed and sealed this 15th day of October, A. D. 1940.

(Seal)

Henry Van Arsdale,
Acting Commissioner of Patents.